United States Patent
Gainey et al.

(10) Patent No.: US 8,060,009 B2
(45) Date of Patent: *Nov. 15, 2011

(54) WIRELESS LOCAL AREA NETWORK REPEATER WITH AUTOMATIC GAIN CONTROL FOR EXTENDING NETWORK COVERAGE

(75) Inventors: Kenneth M. Gainey, Satellite Beach, FL (US); James A. Proctor, Jr., Melbourne Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 10/531,078

(22) PCT Filed: Oct. 15, 2003

(86) PCT No.: PCT/US03/29130
§ 371 (c)(1),
(2), (4) Date: Apr. 12, 2005

(87) PCT Pub. No.: WO2004/036789
PCT Pub. Date: Apr. 29, 2004

(65) Prior Publication Data
US 2006/0063485 A1 Mar. 23, 2006

Related U.S. Application Data

(60) Provisional application No. 60/418,288, filed on Oct. 15, 2002.

(51) Int. Cl.
*H04B 7/14* (2006.01)

(52) U.S. Cl. .................................................... 455/15
(58) Field of Classification Search ............... 455/7–25, 455/11.1, 450; 370/293, 310, 315
See application file for complete search history.

(56) References Cited

U.S. PATENT DOCUMENTS

| 3,363,250 | A | 1/1968 | Jacobson |
| 4,000,467 | A | 12/1976 | Lentz |
| 4,001,691 | A | 1/1977 | Gruenberg et al. |
| 4,061,970 | A | 12/1977 | Magneron |
| 4,081,752 | A | 3/1978 | Sumi et al. |
| 4,124,825 | A | 11/1978 | Webb et al. |

(Continued)

FOREIGN PATENT DOCUMENTS
CN 1186401 7/1998
(Continued)

OTHER PUBLICATIONS

"Performance Analysis of MAC Protocols for Wireless Control Area Network," authored by Kutlu et al., 1996 IEEE.

(Continued)

*Primary Examiner* — Sanh D Phu
(74) *Attorney, Agent, or Firm* — Linda G. Gunderson

(57) ABSTRACT

A frequency translating repeater (200) for use in a time division duplex radio protocol communications system includes an automatic gain control feature. Specifically, a received signal (330) is split to provide signal detection paths (331, 332) wherein detection is performed by amplifiers (301, 302) filters (311, 312), converters (313, 314) and a processor (315). Delay is added using analog circuits such as SAW filters (307, 308, 309, 310) and gain adjustment provided by gain control elements (303, 304, 305, 306).

50 Claims, 2 Drawing Sheets

U.S. PATENT DOCUMENTS

| | | | |
|---|---|---|---|
| 4,204,016 A | 5/1980 | Chavannes et al. | |
| 4,334,323 A | 6/1982 | Moore et al. | |
| 4,368,541 A | 1/1983 | Evans et al. | |
| 4,509,206 A | 4/1985 | Carpe et al. | |
| 4,701,935 A | 10/1987 | Namiki et al. | |
| 4,723,302 A | 2/1988 | Fulmer et al. | |
| 4,777,653 A | 10/1988 | Bonnerot et al. | |
| 4,783,843 A | 11/1988 | Leff et al. | |
| 4,820,568 A | 4/1989 | Harpell et al. | |
| 4,922,259 A | 5/1990 | Hall et al. | |
| 5,023,930 A | 6/1991 | Leslie et al. | |
| 5,095,528 A | 3/1992 | Leslie et al. | |
| 5,214,788 A | 5/1993 | Delaperriere et al. | |
| 5,220,562 A | 6/1993 | Takada et al. | |
| 5,280,480 A | 1/1994 | Pitt et al. | |
| 5,333,175 A | 7/1994 | Ariyavisitakul et al. | |
| 5,341,364 A | 8/1994 | Marra et al. | |
| 5,349,463 A | 9/1994 | Hirohashi et al. | |
| 5,368,897 A | 11/1994 | Kurihara et al. | |
| 5,371,734 A | 12/1994 | Fischer et al. | |
| 5,373,503 A | 12/1994 | Chen et al. | |
| 5,383,144 A | 1/1995 | Kato | |
| 5,408,197 A | 4/1995 | Miyake | |
| 5,408,618 A | 4/1995 | Aho et al. | |
| 5,430,726 A | 7/1995 | Moorwood et al. | |
| 5,446,770 A | 8/1995 | Urabe et al. | |
| 5,465,251 A | 11/1995 | Judd et al. | |
| 5,471,642 A | 11/1995 | Palmer et al. | |
| 5,485,486 A | 1/1996 | Gilhousen et al. | |
| 5,509,028 A | 4/1996 | Marque-Pucheu et al. | |
| 5,515,376 A | 5/1996 | Murthy et al. | |
| 5,519,619 A | 5/1996 | Seda | |
| 5,608,755 A | 3/1997 | Rakib | |
| 5,610,916 A | 3/1997 | Kostreski et al. | |
| 5,648,984 A | 7/1997 | Kroninger et al. | |
| 5,654,979 A | 8/1997 | Levin et al. | |
| 5,659,879 A | 8/1997 | Dupuy et al. | |
| 5,678,177 A | 10/1997 | Beasley | |
| 5,678,198 A | 10/1997 | Lemson | |
| 5,684,801 A | 11/1997 | Amitay et al. | |
| 5,697,052 A | 12/1997 | Treatch et al. | |
| 5,726,980 A | 3/1998 | Rickard | |
| 5,732,334 A | 3/1998 | Miyake | |
| 5,745,846 A | 4/1998 | Myer et al. | |
| 5,754,540 A | 5/1998 | Liu et al. | |
| 5,764,636 A | 6/1998 | Edsall et al. | |
| 5,767,788 A | 6/1998 | Ness | |
| 5,771,174 A | 6/1998 | Spinner et al. | |
| 5,784,683 A | 7/1998 | Sistanizadeh et al. | |
| 5,794,145 A | 8/1998 | Milam et al. | |
| 5,812,933 A | 9/1998 | Niki | |
| 5,815,795 A | 9/1998 | Iwai | |
| 5,825,809 A | 10/1998 | Sim | |
| 5,852,629 A | 12/1998 | Iwamatsu et al. | |
| 5,857,144 A | 1/1999 | Mangum et al. | |
| 5,862,207 A | 1/1999 | Aoshima | |
| 5,875,179 A | 2/1999 | Tikalsky et al. | |
| 5,883,884 A | 3/1999 | Atkinson | |
| 5,884,181 A | 3/1999 | Arnold et al. | |
| 5,890,055 A | 3/1999 | Chu et al. | |
| 5,903,553 A | 5/1999 | Sakamoto et al. | |
| 5,907,794 A | 5/1999 | Lehmusto et al. | |
| 5,963,846 A | 10/1999 | Kurby et al. | |
| 5,963,847 A | 10/1999 | Ito et al. | |
| 5,987,304 A | 11/1999 | Latt et al. | |
| 6,005,855 A | 12/1999 | Zehavi et al. | |
| 6,005,884 A | 12/1999 | Cook et al. | |
| 6,014,380 A | 1/2000 | Hendel et al. | |
| 6,032,194 A | 2/2000 | Gai et al. | |
| 6,061,548 A | 5/2000 | Reudink et al. | |
| 6,088,570 A | 7/2000 | Komara et al. | |
| 6,101,400 A | 8/2000 | Ogaz et al. | |
| 6,108,364 A | 8/2000 | Weaver, Jr. et al. | |
| 6,128,512 A | 10/2000 | Trompower et al. | |
| 6,128,729 A | 10/2000 | Kimball et al. | |
| 6,163,276 A | 12/2000 | Irving et al. | |
| 6,188,694 B1 | 2/2001 | Fine et al. | |
| 6,188,719 B1 | 2/2001 | Collomby et al. | |
| 6,195,051 B1 | 2/2001 | McCoy et al. | |
| 6,202,114 B1 | 3/2001 | Dutt et al. | |
| 6,215,982 B1 | 4/2001 | Trompower et al. | |
| 6,219,739 B1 | 4/2001 | Dutt et al. | |
| 6,222,503 B1 * | 4/2001 | Gietema et al. | 343/890 |
| 6,272,351 B1 | 8/2001 | Langston et al. | |
| 6,285,863 B1 * | 9/2001 | Zhang | 455/234.1 |
| 6,298,061 B1 | 10/2001 | Chin et al. | |
| 6,304,563 B1 | 10/2001 | Blessent et al. | |
| 6,304,575 B1 | 10/2001 | Carroll et al. | |
| 6,331,792 B1 | 12/2001 | Tonietto et al. | |
| 6,339,694 B1 | 1/2002 | Komara et al. | |
| 6,342,777 B1 | 1/2002 | Takahashi et al. | |
| 6,363,068 B1 | 3/2002 | Kinoshita et al. | |
| 6,370,185 B1 | 4/2002 | Schmutz et al. | |
| 6,370,369 B1 | 4/2002 | Kraiem et al. | |
| 6,377,612 B1 | 4/2002 | Baker et al. | |
| 6,377,640 B2 | 4/2002 | Trans et al. | |
| 6,384,765 B1 | 5/2002 | Sjostrand et al. | |
| 6,385,181 B1 | 5/2002 | Tsutsui et al. | |
| 6,388,995 B1 | 5/2002 | Gai et al. | |
| 6,393,299 B1 | 5/2002 | Mizumoto et al. | |
| 6,404,775 B1 * | 6/2002 | Leslie et al. | 370/466 |
| 6,441,781 B1 | 8/2002 | Rog et al. | |
| 6,473,131 B1 | 10/2002 | Neugebauer et al. | |
| 6,480,481 B1 | 11/2002 | Park et al. | |
| 6,501,955 B1 | 12/2002 | Durrant et al. | |
| 6,535,732 B1 | 3/2003 | McIntosh et al. | |
| 6,539,028 B1 | 3/2003 | Soh et al. | |
| 6,539,204 B1 | 3/2003 | Marsh et al. | |
| 6,549,542 B1 | 4/2003 | Dong et al. | |
| 6,549,567 B1 | 4/2003 | Fullerton et al. | |
| 6,563,468 B2 | 5/2003 | Hill et al. | |
| 6,574,198 B1 | 6/2003 | Petersson et al. | |
| 6,628,624 B1 | 9/2003 | Mahajan et al. | |
| 6,664,932 B2 | 12/2003 | Sabet et al. | |
| 6,671,502 B1 | 12/2003 | Ogawa | |
| 6,684,058 B1 * | 1/2004 | Karacaoglu et al. | 455/20 |
| 6,690,657 B1 | 2/2004 | Lau et al. | |
| 6,694,125 B2 | 2/2004 | White et al. | |
| 6,718,160 B2 | 4/2004 | Schmutz et al. | |
| 6,728,541 B2 | 4/2004 | Ohkura et al. | |
| 6,766,113 B1 | 7/2004 | Al-Salameh et al. | |
| 6,781,544 B2 | 8/2004 | Saliga et al. | |
| 6,788,256 B2 | 9/2004 | Hollister | |
| 6,880,103 B2 | 4/2005 | Kim et al. | |
| 6,888,881 B1 | 5/2005 | Nagano | |
| 6,904,266 B1 | 6/2005 | Jin et al. | |
| 6,906,669 B2 | 6/2005 | Sabet et al. | |
| 6,934,511 B1 | 8/2005 | Lovinggood et al. | |
| 6,934,555 B2 | 8/2005 | Silva et al. | |
| 6,944,139 B1 | 9/2005 | Campanella et al. | |
| 6,957,042 B2 | 10/2005 | Williams et al. | |
| 6,983,162 B2 | 1/2006 | Garani et al. | |
| 6,985,516 B1 | 1/2006 | Easton et al. | |
| 6,990,313 B1 * | 1/2006 | Yarkosky | 455/9 |
| 7,027,418 B2 | 4/2006 | Gan et al. | |
| 7,027,770 B2 | 4/2006 | Judd et al. | |
| 7,043,203 B2 | 5/2006 | Miquel et al. | |
| 7,050,442 B1 | 5/2006 | Proctor et al. | |
| 7,050,452 B2 | 5/2006 | Sugar et al. | |
| 7,058,071 B1 | 6/2006 | Myles et al. | |
| 7,058,368 B2 | 6/2006 | Nicholls et al. | |
| 7,088,734 B2 | 8/2006 | Newberg et al. | |
| 7,103,344 B2 | 9/2006 | Menard et al. | |
| 7,120,930 B2 | 10/2006 | Maufer et al. | |
| 7,123,670 B2 | 10/2006 | Gilbert et al. | |
| 7,123,676 B2 | 10/2006 | Gebara et al. | |
| 7,132,988 B2 | 11/2006 | Yegin et al. | |
| 7,133,391 B2 | 11/2006 | Belcea et al. | |
| 7,133,460 B2 | 11/2006 | Bae et al. | |
| 7,139,527 B2 | 11/2006 | Tamaki et al. | |
| 7,167,526 B2 | 1/2007 | Liang et al. | |
| 7,187,904 B2 | 3/2007 | Gainey et al. | |
| 7,193,975 B2 | 3/2007 | Tsutsumi et al. | |
| 7,194,275 B2 | 3/2007 | Bolin et al. | |
| 7,200,134 B2 | 4/2007 | Proctor, Jr. et al. | |
| 7,215,964 B2 | 5/2007 | Miyake et al. | |
| 7,233,771 B2 | 6/2007 | Proctor, Jr. et al. | |

| | | |
|---|---|---|
| 7,248,645 B2 | 7/2007 | Vialle et al. |
| 7,254,132 B2 | 8/2007 | Takao et al. |
| 7,315,573 B2 | 1/2008 | Lusky et al. |
| 7,319,714 B2 | 1/2008 | Sakata et al. |
| 7,321,787 B2 | 1/2008 | Kim et al. |
| 7,339,926 B2 | 3/2008 | Stanwood et al. |
| 7,352,696 B2 | 4/2008 | Stephens et al. |
| 7,409,186 B2 | 8/2008 | Van Buren et al. |
| 7,430,397 B2 | 9/2008 | Suda et al. |
| 7,450,936 B2 | 11/2008 | Kim et al. |
| 7,457,587 B2 | 11/2008 | Chung |
| 7,486,929 B2 | 2/2009 | Van Buren et al. |
| 7,577,398 B2 | 8/2009 | Judd et al. |
| 7,590,145 B2 | 9/2009 | Futch et al. |
| 7,623,826 B2 | 11/2009 | Pergal |
| 7,676,194 B2 | 3/2010 | Rappaport et al. |
| 7,729,669 B2 | 6/2010 | Van Buren et al. |
| 2001/0018328 A1 | 8/2001 | Ohkura et al. |
| 2001/0031646 A1 | 10/2001 | Williams et al. |
| 2001/0040699 A1 | 11/2001 | Osawa et al. |
| 2001/0050580 A1 | 12/2001 | O'toole et al. |
| 2001/0050906 A1 | 12/2001 | Odenwalder et al. |
| 2001/0054060 A1 | 12/2001 | Fillebrown et al. |
| 2002/0004924 A1 | 1/2002 | Kim et al. |
| 2002/0018487 A1 | 2/2002 | Chen et al. |
| 2002/0034958 A1 | 3/2002 | Oberschmidt et al. |
| 2002/0045461 A1* | 4/2002 | Bongfeldt ............ 455/522 |
| 2002/0061031 A1 | 5/2002 | Sugar et al. |
| 2002/0089945 A1 | 7/2002 | Belcea et al. |
| 2002/0101843 A1 | 8/2002 | Sheng et al. |
| 2002/0102948 A1 | 8/2002 | Stanwood et al. |
| 2002/0109585 A1 | 8/2002 | Sanderson |
| 2002/0115409 A1 | 8/2002 | Khayrallah et al. |
| 2002/0119783 A1 | 8/2002 | Bourlas et al. |
| 2002/0136268 A1 | 9/2002 | Gan et al. |
| 2002/0141435 A1 | 10/2002 | Newberg et al. |
| 2002/0159506 A1 | 10/2002 | Alamouti et al. |
| 2002/0163902 A1 | 11/2002 | Takao et al. |
| 2002/0177401 A1 | 11/2002 | Judd et al. |
| 2003/0026363 A1 | 2/2003 | Stoter et al. |
| 2003/0063583 A1 | 4/2003 | Padovani et al. |
| 2003/0124976 A1 | 7/2003 | Tamaki et al. |
| 2003/0139175 A1 | 7/2003 | Kim et al. |
| 2003/0179734 A1 | 9/2003 | Tsutsumi et al. |
| 2003/0185163 A1 | 10/2003 | Bertonis et al. |
| 2003/0211828 A1 | 11/2003 | Dalgleish et al. |
| 2003/0235170 A1 | 12/2003 | Trainin et al. |
| 2003/0236069 A1 | 12/2003 | Sakata et al. |
| 2004/0029537 A1 | 2/2004 | Pugel et al. |
| 2004/0038707 A1 | 2/2004 | Kim et al. |
| 2004/0047333 A1 | 3/2004 | Han et al. |
| 2004/0047335 A1 | 3/2004 | Proctor, Jr. et al. |
| 2004/0110469 A1* | 6/2004 | Judd et al. ............ 455/15 |
| 2004/0131025 A1 | 7/2004 | Dohler et al. |
| 2004/0146013 A1 | 7/2004 | Song et al. |
| 2004/0157551 A1* | 8/2004 | Gainey et al. ............ 455/11.1 |
| 2004/0166802 A1 | 8/2004 | McKay, Sr. et al. |
| 2004/0176050 A1 | 9/2004 | Steer et al. |
| 2004/0198295 A1 | 10/2004 | Nicholls et al. |
| 2004/0208258 A1 | 10/2004 | Lozano et al. |
| 2004/0218683 A1 | 11/2004 | Batra et al. |
| 2004/0229563 A1 | 11/2004 | Fitton et al. |
| 2004/0235417 A1 | 11/2004 | Dean |
| 2004/0248581 A1 | 12/2004 | Seki et al. |
| 2004/0264511 A1 | 12/2004 | Futch et al. |
| 2005/0014464 A1 | 1/2005 | Larsson et al. |
| 2005/0030891 A1 | 2/2005 | Stephens et al. |
| 2005/0042999 A1 | 2/2005 | Rappaport et al. |
| 2005/0190822 A1 | 9/2005 | Fujii et al. |
| 2005/0201315 A1 | 9/2005 | Lakkis |
| 2005/0254442 A1 | 11/2005 | Proctor, Jr. et al. |
| 2005/0256963 A1 | 11/2005 | Proctor, Jr. et al. |
| 2005/0286448 A1 | 12/2005 | Proctor et al. |
| 2006/0028388 A1 | 2/2006 | Schantz |
| 2006/0035643 A1 | 2/2006 | Vook et al. |
| 2006/0041680 A1 | 2/2006 | Proctor, Jr. et al. |
| 2006/0052066 A1 | 3/2006 | Cleveland et al. |
| 2006/0052099 A1 | 3/2006 | Parker |
| 2006/0056352 A1 | 3/2006 | Proctor et al. |
| 2006/0063484 A1 | 3/2006 | Proctor et al. |
| 2006/0098592 A1 | 5/2006 | Proctor, Jr. et al. |
| 2006/0183421 A1 | 8/2006 | Proctor et al. |
| 2006/0203757 A1 | 9/2006 | Young et al. |
| 2006/0262026 A1 | 11/2006 | Gainey et al. |
| 2007/0025349 A1 | 2/2007 | Bajic |
| 2007/0025486 A1 | 2/2007 | Gainey et al. |
| 2007/0032192 A1 | 2/2007 | Gainey et al. |
| 2007/0121546 A1 | 5/2007 | Zuckerman et al. |
| 2007/0286110 A1 | 12/2007 | Proctor, Jr. et al. |
| 2008/0057862 A1 | 3/2008 | Smith |

FOREIGN PATENT DOCUMENTS

| | | |
|---|---|---|
| EP | 0523687 A2 | 1/1993 |
| EP | 0709973 A1 | 5/1996 |
| EP | 0715423 | 6/1996 |
| EP | 0847146 A2 | 6/1998 |
| EP | 0853393 A1 | 7/1998 |
| EP | 0860953 A1 | 8/1998 |
| GB | 2272599 A | 5/1994 |
| GB | 2351420 A | 12/2000 |
| JP | 62040895 | 2/1987 |
| JP | 63160442 | 7/1988 |
| JP | 64011428 | 1/1989 |
| JP | 02100358 | 4/1990 |
| JP | 03021884 | 1/1991 |
| JP | 05063623 | 3/1993 |
| JP | 05102907 | 4/1993 |
| JP | 06013947 | 1/1994 |
| JP | 06334577 | 12/1994 |
| JP | 07030473 | 1/1995 |
| JP | 7079187 A | 3/1995 |
| JP | 07079205 | 3/1995 |
| JP | 7131401 | 5/1995 |
| JP | 8097762 A | 4/1996 |
| JP | 08274706 | 10/1996 |
| JP | 09018484 A | 1/1997 |
| JP | 9130322 A | 5/1997 |
| JP | 9162801 | 6/1997 |
| JP | 9162903 A | 6/1997 |
| JP | 09182155 | 7/1997 |
| JP | 09214418 | 8/1997 |
| JP | 10032557 A | 2/1998 |
| JP | 10107727 | 4/1998 |
| JP | 10135892 | 5/1998 |
| JP | 11055713 | 2/1999 |
| JP | 11127104 | 5/1999 |
| JP | 11298421 A | 10/1999 |
| JP | 2000031877 | 1/2000 |
| JP | 2000502218 T | 2/2000 |
| JP | 2000082983 A | 3/2000 |
| JP | 2000236290 | 8/2000 |
| JP | 20000269873 | 9/2000 |
| JP | 2001016152 | 1/2001 |
| JP | 2001111575 A | 4/2001 |
| JP | 2001136115 A | 5/2001 |
| JP | 2001244864 A | 9/2001 |
| JP | 2002033691 | 1/2002 |
| JP | 2002111571 A | 4/2002 |
| JP | 2002271255 | 9/2002 |
| JP | 2003174394 | 6/2003 |
| JP | 2003198442 | 7/2003 |
| JP | 2003244050 | 8/2003 |
| JP | 2004056210 A | 2/2004 |
| JP | 2004328666 | 11/2004 |
| JP | 2005072646 | 3/2005 |
| JP | 2005110150 A | 4/2005 |
| JP | 2005236626 A | 9/2005 |
| JP | 2005531202 | 10/2005 |
| JP | 2005531265 | 10/2005 |
| JP | 2006503481 | 1/2006 |
| JP | 2006505146 | 2/2006 |
| KR | 100601929 | 8/2006 |
| RU | 2120702 C1 | 10/1998 |
| WO | WO9214339 | 8/1992 |
| WO | WO9715991 | 5/1997 |
| WO | WO9734434 | 9/1997 |
| WO | WO9858461 A1 | 12/1998 |
| WO | WO9959264 A2 | 11/1999 |

| | | |
|---|---|---|
| WO | WO0050971 A2 | 8/2000 |
| WO | WO0152447 | 7/2001 |
| WO | WO0182512 A1 | 11/2001 |
| WO | WO0199308 | 12/2001 |
| WO | WO0208857 A2 | 1/2002 |
| WO | WO0217572 A2 | 2/2002 |
| WO | WO03013005 A2 | 2/2003 |
| WO | WO2004001892 A2 | 12/2003 |
| WO | WO2004001986 A2 | 12/2003 |
| WO | WO2004002014 | 12/2003 |
| WO | WO2004002014 A1 | 12/2003 |
| WO | WO2004004365 | 1/2004 |
| WO | WO2004032362 | 4/2004 |
| WO | WO2004036789 | 4/2004 |
| WO | WO2004038958 | 5/2004 |
| WO | WO2004062305 A1 | 7/2004 |
| WO | WO2005115022 | 12/2005 |

OTHER PUBLICATIONS

Official communication issued from the European Patent Office dated Aug. 7, 2007 for the corresponding European patent application No. 03 759 271.4-2412 (copy enclosed.).

Andrisano, et al., On the Spectral Efficiency of CPM Systems over Real Channel in the Presence of Adjacent Channel and CoChannel Interference: A Comparison between Partial and Full Response Systems, IEEE Transactions on Vehicular Technology, vol. 39, No. 2, May 1990.

Code of Federal Regulations, Title 47 Telecommunication; "Federal Communications Commission code part 15.407," Federal Communications Commission vol. 1, chapter I, part 15.407.

First Office Action issued from the Chinese Patent Office in connection with corresponding Chinese application No. 200380101286.2. corresponding U.S. Appl. No. 10/530,546.

Draft Corrigendum to IEEE Standard for Local and Metropolitan Area Networks—Part 16: Air Interface for Fixed Broadband Wireless Access Systems, IEEE P802.16-2004/Cor1/D5.

Draft IEEE Standard for Local and Metropolitan Area Networks—Part 16: Air Interface for Fixed and Mobile Broadband Wireless Access Systems; Amendment for Physical and Medium Access Control Layers for Combined Fixed and Mobile Operation in Licensed Bands.

First Report issued by IP Australia on Jul. 31, 2007 in connection with the corresponding Australian application No. 2003239577. (corresponding U.S. Appl. No. 10/516,327).

IEEE 802.16(e), Part 16: Air Interface for Fixed Broadband Wireless Access Systems, 2005, Sections 8.4.10.2.1; 8.4.10.3.2.

IEEE Std 802.11-1999 (Reaff 2003), "Part 11: Wireless LAN Medium Access Control (MAC) and Physical Layer (PHY) Specifications," LAN MAN Standards Committee of the IEEE Computer Society; Paragraphs 7.2.3.1 and 7.2.3.9; Paragraph 7.3.2.4; Paragraphs 15.4.6.2 and 18.4.6.2.

IEEE Std 802.11b-1999, "Part 11: Wireless LAN Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11, 1999 Edition, Approved Sep. 16, 1999.

IEEE Std 802.11g-2003, "Part 11: Wireless LAN Medium Access Control (MAC) and Physical Layer (PHY) specifications: Amendment 4: Further Higher Data Rate Extension in the 2.4 GHz Band," IEEE Computer Society, Published by the Institute of Electrical and Electronics Engineers, Inc., Jun. 27, 2003.

IEEE Std 802.16/2001; "Part 16: Air Interface for Fixed Broadband Wireless Access Systems," IEEE Computer Society and the IEEE Microwave Theory and Techniques Society, Published by the Institute of Electrical and Electronics Engineers, Inc., Apr. 8, 2002.

International Search Report—PCT/US03/029130, International Search Authority—US, Jan. 21, 2004 (corresponding U.S. Appl. No. 10/531,078).

Mexican Office communication dated Jul. 2, 2007 issued from Mexican Patent Office for application PA/a/2004/011588 with partial translation thereof. (corresponding U.S. Appl. No. 10/516,327).

Notification of the First Office Action from Chinese Patent Office dates Sep. 8, 2006 for the corresponding Chinese patent application No. 200380105267.7. (corresponding U.S. Appl. No. 10/536;471).

Office Action issued from the Mexican Patent Office dated Feb. 22, 2008 in connection with the corresponding Mexican Patent Application No. PA/a/2004/011588. (corresponding U.S. Appl. No. 10/516,327).

Office communication dated Jan. 12, 2007 issued from the European Patent Office for counterpart application No. 03734136.9-1246. (corresponding U.S. Appl. No. 10/516,327).

Office communication dated Oct. 19, 2006 issued from the Mexican Patent Office for counterpart application No. PA/a/2004/011588. (corresponding U.S. Appl. No. 10/516,327).

Second Office Action issued from the Chinese Patent Office on Jul. 20, 2007 in connection with corresponding Chinese application No. 200380101286.2. (corresponding U.S. Appl. No. 10/530,546).

Specifications for2.3 GHz Band Portable Internet Service—Physical & Medium Access Control Layer, TTAS.KO-06.0082/R1, Dec. 2005.

Third Office Action issued from the Patent Office of People's Republic of China dated Jan. 4, 2008 in corresponding Chinese Patent Application No. 200380101286.2. (corresponding U.S. Appl. No. 10/530,546).

Translation of Office Action issued by Chinese Patent Office on Oct. 19, 2007 in connection with the corresponding Chinese application No. 03814391.7. (corresponding U.S. Appl. No. 10/516,327).

U.S. PTO Office Action mailed on Apr. 17, 2007 for the corresponding parent U.S. Appl. No. 11/339,838, now U.S. Patent No. 7,230,935.

U.S. PTO Office Action mailed on Jan. 24, 2007 for the corresponding parent U.S. Appl. No. 11/339,838, now U.S. Patent No. 7,230,935.

U.S. PTO Office Action mailed on Nov. 21, 2006 for the corresponding parent U.S. Appl. No. 11/339,838, now U.S. Patent No. 7,230,935.

U.S. PTO Office Action mailed on Nov. 6, 2006 for the corresponding parent U.S. Appl. No. 11/339,838, now U.S. Patent No. 7,230,935.

Kannangara, et al., "Analysis of an Adaptive Wideband Duplexer with Double-Loop Cancellation," IEEE Transactions on Vehicular Technology, vol. 56, No. 4, Jul. 2007, pp. 1971-1982.

Kutlu, et al., "Performance Analysis of MAC Protocols for Wireless Control Area Network," 1996 IEEE, pp. 494-499.

Office Action English translation dated Jul. 4, 2008 issued from Chinese Patent Office for Application No. 03814391.7.

Office Action English translation dated Jun. 29, 2009 issued from Japanese Patent Office for Application No. 2004-541532.

Official communication issued from the European Patent Office dated Aug. 7, 2007 for the corresponding European patent application No. 03759271.4-2412.

Official communication issued from the European Patent Office dated Dec. 19, 2006 for the corresponding European patent application No. 03759271.4-2412.

Supplementary European Search Report—EP03759271, Search Authority—Munich Patent Office, Sep. 14, 2006.

Translation of Office Action in Japanese application 2004-515701, corresponding to U.S. Appl. No. 10/516,327, citing WO00050971, JP2000-031877, JP2002-033691, JP2002-111571 and JP11-127104. Dated May 25, 2010.

Translation of Office Action in Japanese application 2004-544751, corresponding to US application 10/531,078, citing W000050971, JP2002-111571, JP05-102907, JP63-160442, JP2000-502218, JP10-032557 and JP2000-082983. Dated Aug. 25, 2009.

Translation of Office Action in Japanese application 2004-553510; corresponding to U.S. Appl. No. 10/533,589, citing W000050971, JP09-182155, JP64-011428 and JP62-040895. Dated Sep. 29, 2009.

Translation of Office Action in Japanese application 2004-565505, corresponding to U.S. Appl. No. 10/563,471, citing JP08-097762 and JP2001-111575. Dated Aug. 11, 2009.

Translation of Office Action in Japanese application 2004-565505, corresponding to U.S. Appl. No. 10/563,471, citing JP08-097762, JP2001-111575, JP09-018484 and JP11-055713. Dated Sep. 14, 2010.

Translation of Office Action in Japanese application 2004-565505, corresponding to U.S. Appl. 10/563,471, citing JP09-018484. Dated Feb. 23, 2010.

Translation of Office Action in Korean application 2008-7026775. corresponding to U.S. Appl. No. 11/730,361, citing KR100610929 Dated Aug. 30, 2010.

Translation of Office Action in Japanese application 2007-513349 corresponding to U.S. Appl. No. 11/546,242, citing WO04032362, WO2004001986, JP09214418, JP07131401, JP2004056210, JP2000082983, JP09130322, JP2003244050, JP2003198442, US6377612, JP2006503481, JP2002111571, JP09162801, JP2005531202, W02004001892 and JP10107727 dated Nov. 16, 2010.

Translation of Office Action in Japanese application 2009-503041, corresponding to U.S. Appl. No. 11/730,361, citing WO05115022, JP10-135892, JP2005-531265, 2006-503481, JP2005-531202 and JP2006-505146. Dated Oct. 26, 2010.

Translation of Office Action in Japanese application 2009-526736 corresponding to U.S. Appl. No. 12/307,801 , citing US20040110469, US20060019603, JP2005072646, JP2001016152, JP11298421, JP2001136115, JP2005110150, JP2005236626, W09715991 and W00199308 dated Jan. 4, 2011.

Translation of Office Action in Korean application 2009-7010639, corresponding to US application 12/439,018, citing W001052447 and US2004/0208258, Dated Nov. 15, 2010.

* cited by examiner

WIRELESS LOCAL AREA NETWORK REPEATER WITH AUTOMATIC GAIN CONTROL FOR EXTENDING NETWORK COVERAGE

CROSS REFERENCE TO RELATED APPLICATIONS

This application is related to and claims priority from U.S. Provisional Application No. 60/418,288 filed Oct. 15, 2002, and is further related to PCT Application PCT/US03/16208 entitled WIRELESS LOCAL AREA NETWORK REPEATER, the contents of which are incorporated herein by reference.

BACKGROUND OF THE INVENTION

The present invention relates generally to wireless local area networks (WLANs) and, particularly, the present invention relates to extending the coverage area associated with a WLAN repeater using Automatic Gain Control (AGC).

Several standard protocols for wireless local area networks, commonly referred to as WLANs, are becoming popular. These include protocols such as 802.11 (as set forth in the 802.11 wireless standards), home RF, and Bluetooth. The standard wireless protocol with the most commercial success to date is the 802.11b protocol although next generation protocols, such as 802.11g, are also gaining popularity.

While the specifications of products utilizing the above standard wireless protocols commonly indicate data rates on the order of, for example, 11 MBPS and ranges on the order of, for example, 100 meters, these performance levels are rarely, if ever, realized. Performance shortcomings between actual and specified performance levels have many causes including attenuation of the radiation paths of RF signals, which for 802.11b are in the range of 2.4 GHz in an operating environment such as an indoor environment. Access point to client ranges are generally less than the coverage range required in a typical home, and may be as little as 10 to 15 meters. Further, in structures having split floor plans, such as ranch style or two story homes, or those constructed of materials capable of attenuating RF signals, areas in which wireless coverage is needed may be physically separated by distances outside of the range of, for example, an 802.11 protocol based system. Attenuation problems may be exacerbated in the presence of interference in the operating band, such as interference from other 2.4 GHz devices or wideband interference with in-band energy. Still further, data rates of devices operating using the above standard wireless protocols are dependent on signal strength. As distances in the area of coverage increase, wireless system performance typically decreases. Lastly, the structure of the protocols themselves may affect the operational range.

Repeaters are commonly used in the mobile wireless industry to increase the range of wireless systems. However, problems and complications arise in that system receivers and transmitters may operate at the same frequency in a WLAN utilizing, for example, 802.11 WLAN or 802.16 WMAN wireless protocols. In such systems, when multiple transmitters operate simultaneously, as would be the case in repeater operation, difficulties arise. Typical WLAN protocols provide no defined receive and transmit periods and, thus, because random packets from each wireless network node are spontaneously generated and transmitted and are not temporally predictable, packet collisions may occur. Some remedies exist to address such difficulties, such as, for example, collision avoidance and random back-off protocols, which are used to avoid two or more nodes transmitting packets at the same time. Under 802.11 standard protocol, for example, a distributed coordination function (DCF) may be used for collision avoidance.

Such operation is significantly different than the operation of many other cellular repeater systems, such as those systems based on IS-136, IS-95 or IS-2000 standards, where the receive and transmit bands are separated by a deplexing frequency offset. Frequency division duplexing (FDD) operation simplifies repeater operation since conflicts associated with repeater operation, such as those arising in situations where the receiver and transmitter channels are on the same frequency for both the uplink and the downlink, are not present.

Other cellular mobile systems separate receive and transmit channels by time rather than by frequency and further utilize scheduled times for specific uplink/downlink transmissions. Such operation is commonly referred to as time division duplexing (TDD). Repeaters for these systems are more easily built, as the transmission and reception times are well known and are broadcast by a base station. Receivers and transmitters for these systems may be isolated by any number of means including physical separation, antenna patterns, or polarization isolation. Even for these systems, the cost and complexity of a repeater may be greatly reduced by not offering the known timing information that is broadcast, thus allowing for economically feasible repeaters.

Thus, WLAN repeaters operating on the same frequencies have unique constraints due to the above spontaneous transmission capabilities and therefore require a unique solution. Since these repeaters use the same frequency for receive and transmit channels, some form of isolation must exist between the receive and transmit channels of the repeater. While some related systems such as, for example, CDMA systems used in wireless telephony, achieve channel isolation using sophisticated techniques such as directional antennas, physical separation of the receive and transmit antennas, or the like, such techniques are not practical for WLAN repeaters in many operating environments such as in the home where complicated hardware or lengthy cabling is not desirable or may be too costly.

One system, described in International Application No. PCT/US03/16208 and commonly owned by the assignee of the present application, resolves many of the above identified problems by providing a repeater which isolates receive and transmit channels using a frequency detection and translation method. The WLAN repeater described therein allows two WLAN units to communicate by translating packets associated with one device at a first frequency channel to a second frequency channel used by a second device. The direction associated with the translation or conversion, such as from the frequency associated with the first channel to the frequency associated with the second channel, or from the second channel to the first channel, depends upon a real time configuration of the repeater and the WLAN environment. The WLAN repeater may be configured to monitor both channels for transmissions and, when a transmission is detected, translate the received signal at the first frequency to the other channel, where it is transmitted at the second frequency.

The above described approach solves both the isolation issue and the spontaneous transmission problems as described above by monitoring and translating in response to packet transmissions and may further be implemented in a small inexpensive unit. However, a WLAN repeater, in order to be legally compliant, must transmit within the power and spectrum limitations promulgated by, for example, the FCC. Difficulties arise however in that a received signal may have a widely varying power level requiring precise compensation for factors contributing to disruptions and failed or suboptimal signal retransmission caused by interference and the like.

SUMMARY OF THE INVENTION

Accordingly, in various exemplary and alternative exemplary embodiments, the present invention extends the coverage area in a wireless environment such as a WLAN environment, and, broadly speaking, in any time division duplex system including IEEE 802.16, IEEE 802.20 and TDS-CDMA, with a unique frequency detection and translation method. An exemplary WLAN frequency translating repeater allows two WLAN nodes or units to communicate by translating packets from a first frequency channel used by one device to a second frequency channel used by a second device. The direction of the conversion from channel 1 to channel 2, verses from channel 2 to Channel 1, is dependent upon real time configuration. The repeater may preferably monitor both channels for transmissions, and when a transmission on a channel is detected, the repeater is configured to translate the received signal to the other channel, where it is transmitted.

In a preferred embodiment, the signal received is detected on a first signal path and gain is applied on a second signal path. Further, the gain signal path preferably includes delay circuits to permit signal detection and gain setting to occur before the signal must be retransmitted. The gain is set based upon the detected receive power level to achieve a target transmit power level that is constant independent of the receive power level. However, the target power may be first determined or adjusted based upon criteria that includes one or more of the following: separation between receive and transmit frequencies, regulatory rule compliance, temperature, received power level, transmit power level and detected interference. A microprocessor with software, including calibration tables, is appropriate for performing the calculation of an appropriate gain set point, which fixes the target output power. The details of this invention are described in detail in the figure descriptions that follow.

The preferred approach solves both the isolation issue, allowing a small inexpensive unit, and it solves the spontaneous transmission problem as it monitors and responds in reaction to the transmissions, with a constant output power at the transmitter. This output power may be different depending on the configuration of the repeater as determined by the microprocessor.

DETAILED DESCRIPTION OF THE INVENTION

Figure 1:
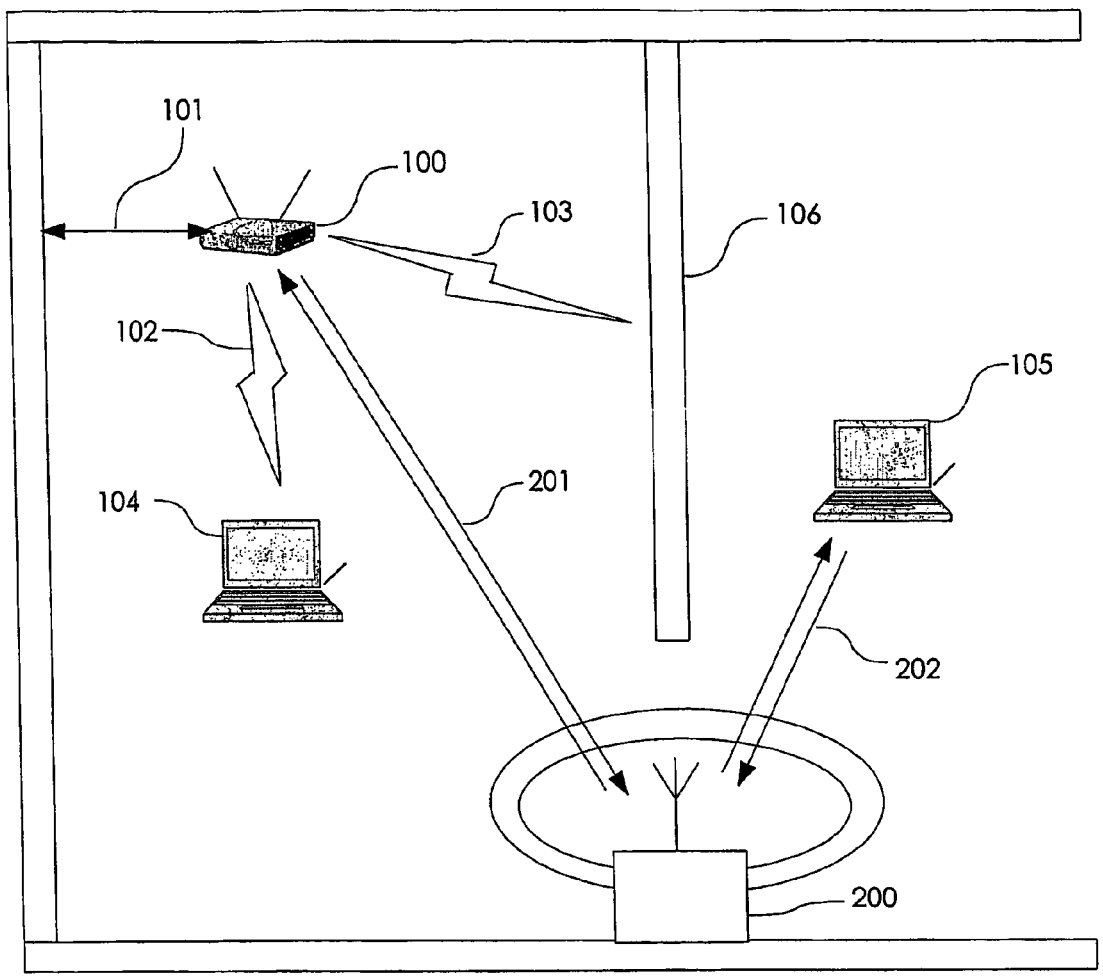
FIG. 1 is a diagram illustrating a WLAN including an exemplary repeater having automatic gain control in accordance with various exemplary embodiments.

Referring now to FIG. 1, a wide area connection 101, which could be, for example, an Ethernet connection, a T1 line, a wideband wireless connection or any other electrical connection providing a data communications path, may be connected to a wireless gateway, or access point (AP) 100. The wireless gateway 100 sends RF signals, such as IEEE 802.11 packets or signals based upon Bluetooth, Hyperlan, or other wireless communication protocols, to client units 104, 105, which may be personal computers, personal digital assistants, or any other devices capable of communicating with other like devices through one of the above mentioned wireless protocols. Respective propagation, or RF, paths to each of the client units 104, 105 are shown as 102, 103.

While the signal carried over RF path 102 is of sufficient strength to maintain high-speed data packet communications between the client unit 104 and the wireless gateway 100, the signals carried over the RF path 103 and intended for the client unit 105 would be attenuated when passing through a structural barrier such as walls 106 or 107 to a point where few, if any, data packets are received in either direction if not for a wireless repeater 200, the structure and operation of which will now be described.

To enhance the coverage and/or communication data rate to the client unit 105, wireless repeater 200 receives packets transmitted on a first frequency channel 201 from the wireless gateway 100. The wireless repeater 200, which may be housed in an enclosure typically having dimensions of, for example, 2.5"×3.5"×0.5", and which preferably is capable of being plugged into a standard electrical outlet and operating on 110 V AC power, detects the presence of a packet on the first frequency channel 201, receives the packet and re-transmits the packet with more power on a second frequency channel 202. Unlike conventional WLAN operating protocols, the client unit 105 operates on the second frequency channel, even though the wireless gateway 100 operates on the first frequency channel. To perform the return packet operation, the wireless repeater 200 detects the presence of a transmitted packet on the second frequency channel 202 from the client unit 105, receives the packet on the second frequency channel 202, and re-transmits the packet on the first frequency channel 201. The wireless gateway 100 then receives the packet on the first frequency channel 201. In this way, the wireless repeater 200 is capable of simultaneously receiving and transmitting signals as well as extending the coverage and performance of the wireless gateway 100 to the client unit 105.

To address the difficulties posed by obstructions as described above and attendant attenuation of the signal strength along obstructed paths and thus to enhance the coverage and/or communication data rate to client unit 105, exemplary wireless repeater 200, as shown in FIG. 1, may be used to retransmit packets beyond a range limited by propagation path constraints through, for example, frequency translation. Packets transmitted on a first frequency channel 201 from AP 100 are received at repeater 200 and re-transmitted, preferably with a greater power level, on a second frequency channel 202. Client unit 105 preferably operates on second frequency channel 202 as if AP 100 were also operating on it, such as with no knowledge that AP 100 is really operating on first frequency channel 201 such that the frequency translation is transparent. To perform return packet operations, repeater unit 200 detects the presence of a transmitted return packet on second frequency channel 202 from client unit 105, and is preferably configured to receive the packet on second frequency channel 202, and to retransmit the data packet to, for example AP 100, on first frequency channel 201.

Wireless repeater 200 is preferably capable of receiving two different frequencies simultaneously, such as first frequency channel 201 and second frequency channel 202 determining which channel is carrying a signal associated with, for example, the transmission of a packet, translating from the original frequency channel to an alternative frequency channel and retransmitting the frequency translated version of the received signal on the alternative channel. Details of internal repeater operation may be found in co-pending PCT Application No. PCT/US03/16208.

Repeater 200 may thus receive and transmit packets at the same time on different frequency channels thereby extending the coverage and performance of the connection between AP 100 and client unit 105, and between peer-to-peer connections such as from one client unit to another client unit. When many units are isolated from one another, repeater unit 200 further acts as a wireless bridge allowing two different groups of units to communicate where optimum RF propagation and coverage or, in many cases, any RF propagation and coverage was not previously possible.

Figure 2:
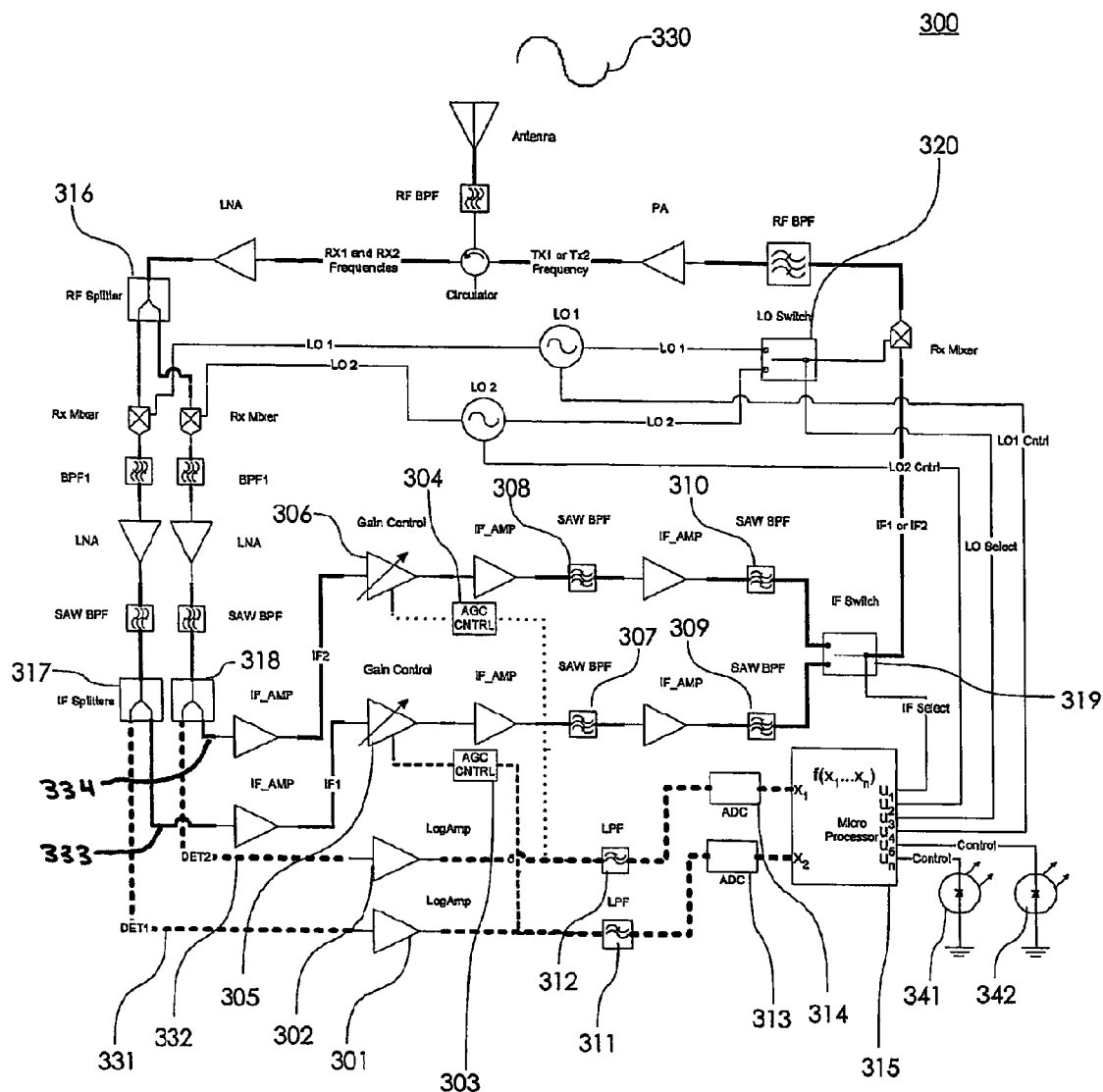
FIG. 2 is a schematic drawing illustrating an exemplary gain control interface unit of FIG. 1.

In accordance with various exemplary embodiments, repeater 200 is preferably configured to receive a signal and translate the frequency of the received signal with very little distortion or loss of the signal by properly controlling the gain of an exemplary transceiver section via Automatic Gain Control (AGC) circuitry 300 shown, for example, in FIG. 2. In a preferred embodiment, wireless repeater 200 shown is capable of receiving two different frequencies simultaneously, determining which one is present, translating the frequency of the one that is present to the other frequency and retransmitting a frequency translated version of the received signal.

In accordance with one preferred exemplary embodiment, AGC circuitry 300 utilizes RF delay and filter elements 307-310 to allow analog storage of an exemplary received waveform while signal detection and transmitter configuration takes place. It should be noted that signal detection may occur both prior to and during transit of signals in RF delay elements 307-310 providing time to perform system configuration. It should be noted that a detector power level is preferably used to set a gain value on a parallel signal path as part of the gain control operation.

Repeater AGC circuitry 300 further includes logarithmic amplifier 301 and 302, AGC control circuit 303 and 304, gain control element 305 and 306, which may preferably include variable gain or variable attenuator elements, and RF delay element 307-310 which may preferably include analog storage devices such as, for example, delay lines and/or band pass filters. Low pass filter 311 and 312, and analog to digital converter (ADC) 313 and 314 are further preferably used to accomplish gain control under the direction and control of, for example, microprocessor 315.

Since repeater 200, in accordance with various exemplary embodiments, is configured to simultaneously detect and process two different frequency signals, received signal 330 is split and propagated on two different RF paths, for example, using RF splitter 316. Likewise, because the two different frequency paths must be delayed and controlled separately, each signal path is further split by, for example, IF Splitters 317 and 318. One of the split signal outputs from IF Splitter 317 is preferably coupled to logarithmic amplifiers 301 and the other split signal output is preferably coupled to gain control elements 305. Likewise, one of the split signal outputs from IF Splitter 318 is preferably coupled to logarithmic amplifiers 302 and the other split signal output is preferably coupled to gain control elements 306. The output of logarithmic amplifiers 301 is fed to AGC control circuit 303 and low pass filter 311. Likewise, the output of logarithmic amplifiers 302 is fed to AGC control circuit 304 and low pass filter 312. It should be noted that while logarithmic amplifiers 301 and 302 preferably provide an output voltage proportional to the logarithm of the power of received signal 330, tracking the envelope thereof, other devices known to those of ordinary skill in the art may also be used to track the envelope or samples of the envelope directly or proportionately.

The basic operation of components along the detection path of received signal 330 such as, for example, low pass filters 311 and 312, analog-to-digital converters (ADC) 313 and 314, and processor 315 for example, would be readily apparent to those of ordinary skill in the art and thus a detailed review of the basic operation thereof is omitted, such operation is disclosed in detail in commonly assigned co-pending PCT Patent Application No. PCT/US03/16208. However it should be briefly noted that processor 315 preferably detects the presence of an IF signal on detection paths DET1 331 and DET2 332. As described in the above identified co-pending application, signal detection may be based on the signal level exceeding a threshold using, for example, analog or digital signal comparison implements in processor 315, or could be performed by other means well known to those of ordinary skill in the art. Once the signal is detected, gain control is applied to the signal using for example, AGC control circuits 303 and 304 on IF path IF1 333 or IF2 334 respectively, depending on the channel.

With reference still to FIG. 2 of the drawings, gain control is applied to signals on IF paths IF1 333 and IF2 334 using AGC control circuits 303 and 304 which circuits provide, inter alia, filtering of the analog voltage at the output of, for example, logarithmic amplifiers 301 and 302, any DC offset adjustment which may be necessary, AGC set point reference and control, level shifting/scaling, any required polarity reversal, and the like as would be appreciated by one of ordinary skill in the art. The output of AGC control circuits 303 and 304 are fed to gain control elements 305 and 306 which may provide either adjustable gain or adjustable attenuation of received signal 330 based on a value associated with, for example, the desired transmitter output power. It should be noted that AGC control circuits 303 and 304 may be one of a variety of gain control circuits, devices, or the like, as would be well known to those of ordinary skill in the art.

As an example of gain control in accordance with various exemplary embodiments, a variable attenuator could be used for gain control element 305 under the following conditions: desired output power +15 dBm, received signal power −80 dBm, total transceiver losses 65 dB, total transceiver gains 165 dB.

Under these conditions, a variable attenuator associated with, for example, gain control element 305, should be set according to the relation: Rx Signal Power−Desired Output Power+Total Gains−Total Losses, thus the attenuation would be−80 dBm−15 dBm+165 dB−65 dB resulting in 5 dB of attenuation. It will be appreciated that a voltage may be calculated and applied to the gain control element 305, for example, by AGC control circuit 303 resulting in the desired 5 dB attenuation setting. It should also be noted that while ACG control circuit 303 and gain control element 305 are described herein, the above description applies to the operation of AGC control circuit 304 and gain control element 306.

Thus receive signal 330 in order to be retransmitted in accordance with various exemplary embodiments, and in accordance with the present example, is preferably output from gain control element 305 and delayed via Surface Acoustic Wave (SAW) filters 308 and 310. It will be appreciated that the delay introduced by SAW filters 308 and 310 acts to essentially store the analog waveform while AGC and signal detection processes, for example as described above, are carried out, meaning that detection and gain control setting are preferably completed during the propagation interval of the signal.

In accordance with various exemplary and preferred exemplary embodiments, RF delays are imposed through SAW filters 307-310 enabling analog signal storage and channel selection, jammer suppression, and a feed-forward variable gain control path. AGC control circuits 303 and 304 and gain control elements 305 and 306 may be biased or otherwise set under control of for example processor 315, which is preferably a micro-processor, such as a general purpose processor, dedicated processor, signal processing processor, or the like as would be understood by one of ordinary skill in the art. Further, set points may be obtained by processor 315 from a look up table or the like depending on which channel received signal 330 is received on and which channel is selected for signal retransmission. It should be noted that different bands have different transmit power limitations in different countries, thus the selection of gain set points may be driven by several factors resulting from the need to meet FCC requirements and related specifications for the desired band such as spectral re-growth and Effective Isotropic Radiated Power (EIRP).

After detection and setting of the gain control, IF Switch 319 and LO Switch 320 are preferably set to retransmit received signal 330 at a different frequency without significantly cutting off the waveform preamble. It is important to note that detection and power sensing, for example, as described above, is preferably performed on detector paths DET1 331 and DET2 332, but actual gain control may be applied the on IF paths IF1 333 and IF2 334. More specifically referring again to FIG. 2, outputs from the logarithmic amplifiers 301 and 302 are fed to AGC control circuits 303 and 304 which circuits are making adjustments either as variable gain or attenuation with regard to gain control elements 305 and 306.

One factor in determining a sequence of signal detection and gain control is the effect caused by splitting the output voltage from logarithmic amplifiers 301 and 302 into a signal detection path and a gain control path, each having potentially two different filter bandwidths. As can be noted from FIG. 2, the gain control path is the path to AGC control circuits 303 and 304, while the signal detection path is the path leading to low pass filters 311 and 312, as previously described. Thus, if desired, the AGC control values and the signal detection filter bandwidth could be set differently. For example, the AGC control loop could be set to react very quickly to the incoming power envelop while signal detection, as carried out, for example, in ADC 313 and 314 and processor 315, could be configured to react more slowly. As a result, received signal 330 propagating in gain control elements 305 and 306 can be tracked very accurately while the portion of received signal 330 propagating in ADC 313 and 314 and processor 315 may track more slowly, but with more detection process gain.

It should be noted that in accordance with various exemplary and preferred exemplary embodiments, two separate detectors are used for performing detection of the presence of received signal 330 and for detection of the power level thereof in order to set gain. Thus, since signal detection may occur more slowly than AGC as described, different signal detection and AGC filter bandwidths may be used beneficially, allowing variable control elements associated with AGC such as gain control elements 305 and 306 to have a faster or slower response than the output of filters 311 and 312.

Another factor in controlling gain is the relative distance between the receive and transmit channels. Specifically, depending on the distance therebetween, the target output power or set point from the gain control elements 305 and 306 can be different to the extent that additional performance may be gained when the receive and transmit channels are further apart in frequency. Gain values may be increased in gain control elements 305 and 306 while continuing to meet performance requirements. Further, AGC control circuits 303 and 304 may be programmed to increase power based on the frequency difference or, alternatively, processor 315 may be programmed to control AGC control circuits 303 and 304 based on frequency separation. Adjusting set points based on frequency separation may further include applying more filtering to any leakage signals picked up by a receiver to avoid self interference.

A factor affecting the choice of which channels to operate on during initial repeater power up may be influenced by choosing repeating channels based on the ability to transmit more power in different FCC bands or bands controlled by other regulatory bodies. For example, in the U-NII bands for operation in the United States, the maximum allowable transmit power for CH36-48 is 50 mW, for CH52-64 is 250 mW, and for CH149-161 is 1 W. Therefore it is possible to receive a signal in on a channel associated with one of the lower power bands and choose a channel on a different band allowing higher transmit power, thereby allowing a higher AGC set point. Thus the set points for a translation, say from F1 to F2 and F2 to F1 would be different. The decision of which channels to select is preferably pre-programmed during manufacturing, or, alternatively could be programmed in the field, in, for example, AGC control circuits 303 and 304 or processor 315.

In accordance with other aspects of the present invention, gain control may require AGC calibration during initial manufacturing. Calibration may be desirable to allow the use of lower tolerance parts thus reducing cost. Calibration may further provide for accuracy required for regional or band specific power settings. Accordingly, calibration may include setting up circuits and devices in accordance with one or more of the following; regional regulatory rules, frequency channel, received power level, transmit power level, temperature, and the like. In accordance with various exemplary and preferred exemplary embodiments, repeater 200 using, for example, processor 315, may store calibration tables and the like and be configured, for example through the use of software, programs, instructions or the like, to pass specific calibration values to AGC control circuits 305 and 306. Processor 315 would preferably utilize a digital to analog conversion process to control the set point.

As mentioned above, different detector outputs may be used for AGC and signal detection. Signal detection may be performed in an analog only configuration using, for example, a threshold comparator under the control of processor 315 which may be configured to actively control, for example, an analog reference voltage a threshold comparator uses to make the detection decision. Alternatively, received signal 330 may be digitized and a detection decision made, for example, in processor 315. Once concern related to using a digital path and processor 315 includes delay associated with, for example, digital sampling and decision making instructions in a processor 315.

In accordance with various alternative exemplary embodiments an analog comparator (not shown) having a threshold controlled by processor 315 may be used. Such a configuration could be equipped with a digital override to allow for a fast initial decision, converging to a slower more accurate and controllable decision using software, programs, instructions, and the like readable and executable by processor 315. For example, if an interferer is detected, and processor 315 recognizes that the packet duration is longer than the wireless protocol will allow, AGC control circuits 303 and 304 and/or detector could be turned off by processor 315 to prevent signal transmission. Thus the normal AGC setting may be directly controlled and overridden. Such control is further useful in situations including when a system feed-back oscillation is detected.

One of ordinary skill in the art will recognize that various techniques can be utilized to determine AGC set points as well as different signal detector configurations in the present invention. Additionally, various components, such as the gain control elements 305 and 306, AGC gain control 303 and 304, functionality of processor 315 and other elements could be combined into a single integrated device. Other changes and alterations to specific components, and the interconnections thereof, can be made by one of ordinary skill in the art without deviating from the scope and spirit of the present invention.

The invention has been described in detail with particular references to presently preferred embodiments thereof, but it will be understood that variations and modifications can be effected within the spirit and scope of the invention.

What is claimed is:

1. A frequency translating repeater for use in a time division duplexing (TDD) radio protocol system, the frequency translating repeater comprising:
   a detector circuit configured to detect if a signal is present on one of two frequency channels associated with the frequency translating repeater;
   a frequency translator configured to change a frequency channel associated with the signal from the one of the two frequency channels to an other of the two frequency channels;
   a gain control circuit configured to adjust a gain of the signal; and
   a delay circuit configured to add a delay to the signal to compensate for a signal detection interval, a gain adjustment interval and a transmitter configuration interval.

2. The frequency translating repeater according to claim 1, wherein the delay circuit includes an analog storage device.

3. The frequency translating repeater according to claim 1, wherein the delay circuit includes at least one surface acoustic wave filter configured for one or more of: analog signal storage and channel selection.

4. The frequency translating repeater according to claim 1, wherein the detector circuit includes a processor.

5. The frequency translating repeater according to claim 4, wherein the detector circuit further includes an analog detection circuit.

6. The frequency translating repeater according to claim 1, wherein the gain control circuit has one of a gain value and an attenuation value associated therewith.

7. The frequency translating repeater according to claim 6, wherein:
   the detector is further configured to detect a received signal strength of the signal, and
   the gain control circuit is configured to use the received signal strength of the signal to adjust the gain of the signal.

8. The frequency translating repeater according to claim 7, wherein the gain control circuit is further configured to control the gain value or the attenuation value or both based on one or more predetermined criteria to achieve a specific signal transmit output power.

9. The frequency translating repeater according to claim 8, wherein the one or more predetermined criteria is for modifying the specific signal transmit output power and includes at least one criterion selected from the group consisting of frequency separation between a receive frequency and a transmit frequency, a regulatory rule, a temperature, a received power level, a transmit power level, and a detected interference level.

10. The frequency translating repeater according to claim 8, further comprising:
    an antenna for receiving the signal on one of the two frequency channels;
    a RF splitter coupled to the antenna, the RF splitter configured to the signal onto a first path and a second path; and
    first and second IF splitters disposed on the first and second paths, respectively, the first IF splitter to split the first path into a first IF signal path and a first detection path, the second IF splitter to split the second path into a second IF signal path and a second detection path,
    wherein the detector circuit and the gain control circuit are located on the first detection path and the second detection path, wherein the delay circuit is located on the first IF signal path and the second IF signal path, wherein the detector circuit includes a processor, wherein the processor further includes a memory and wherein the one or more predetermined criteria are stored in the memory.

11. A frequency translating repeater for use in a time division duplexing (TDD) radio protocol system, the frequency translating repeater comprising:
    a detector circuit configured to detect if a signal is present on one of two frequency channels associated with the frequency translating repeater and to detect a received detected signal power of the signal;
    a frequency translator configured to change a frequency channel associated with the signal from the one of the two frequency channels to an other of the two frequency channels;
    a delay circuit configured to add a delay to the signal to compensate for a signal detection interval and a transmitter configuration interval; and
    a gain control circuit configured to adjust a gain value of the signal at least in part based on the received detected signal power detected by the detector circuit.

12. The frequency translating repeater according to claim 11, wherein the gain control circuit is further configured to adjust the gain value based at least in part on criteria including which of the one of the two frequency channels the signal is received on, and which of the other of the two frequency channels is changed to.

13. The frequency translating repeater according to claim 12, wherein the criteria further includes at least one of a regulatory rule for transmission, an operating temperature, and frequency separation between receive and transmit frequencies.

14. The frequency translating repeater according to claim 12, wherein the criteria further includes a distance between a receive frequency and a transmit frequency, and wherein the automatic gain control circuit is further configured to apply more filtering to the signal based on the distance.

15. A frequency translating repeater for use in a time division duplexing (TDD) radio protocol system, the frequency translating repeater comprising:
    a detector circuit configured to detect if a signal is present on one of two frequency channels associated with the frequency translating repeater;
    a frequency converter configured to convert the signal from a radio frequency (RF) signal to an intermediate frequency (IF) signal;
    a frequency translator configured to change a frequency channel associated with the IF signal from the one of the two frequency channels to an other of the two frequency channels;

a delay circuit configured to add a delay to the IF signal to compensate for a signal detection interval and a transmitter configuration interval; and a gain control circuit configured to adjust a gain value of the IF signal.

16. The frequency translating repeater according to claim 15, wherein the gain control circuit is further configured to adjust the gain value of the IF signal at least in part based on a received detected signal power detected by the detector circuit.

17. The frequency translating repeater according to claim 15, further comprising:

an antenna for receiving the signal present on the one of two frequency channels;

a RF splitter coupled to the antenna, the RF splitter for splitting the signal onto a first path and a second path; and first and second IF splitters disposed on the first and second paths, respectively, the first IF splitter for splitting the first path into a first IF signal path and a first detection path, the second IF splitter for splitting the second path into a second IF signal path and a second detection path, wherein the detector circuit is located on the first detection path and the second detection path, wherein the delay circuit is located on the first IF signal path and the second IF signal path, wherein the gain control circuit is located on the first detection path and the second detection path.

18. The frequency translating repeater according to claim 17, wherein the detector circuit includes a logarithmic amplifier and wherein the output of the logarithmic amplifier is coupled to the gain control circuit for control thereof.

19. The frequency translating repeater according to claim 18, wherein the detector circuit and the automatic gain control circuit each have different bandwidths.

20. The frequency translating repeater according to claim 19, wherein the automatic gain control circuit includes a processor and a memory storing a predetermined criteria and wherein the processor is configured to use the predetermined criteria to establish an offset gain value of the IF signal, resulting at least in part in a transmitter target output power independent of the detected receive power of the signal as detected by the detector circuit.

21. The frequency translating repeater according to claim 20, wherein the processor is further configured to:

convert the output of the logarithmic amplifier to a digital signal; and establish the gain value of the IF signal using the digital signal.

22. A method for frequency translation in a frequency translating repeater for use in a time division duplexing (TDD) radio protocol system, the method comprising:

detecting if a signal is present on one of two frequency channels associated with the frequency translating repeater;

changing a frequency channel associated with the signal from the one of the two frequency channels to an other of the two frequency channels; and adding a delay to the signal to equivalent to a signal detection interval and a transmitter configuration interval.

23. The method according to claim 22, wherein the adding the delay includes delaying the signal in an analog storage device.

24. The method according to claim 22, wherein the adding the delay includes delaying the signal in at least one surface acoustic wave filter configured for one or more of: analog signal storage and channel selection.

25. The method according to claim 24, wherein the detecting includes detecting in an analog detection circuit.

26. The method according to claim 22, further comprising:

splitting the signal onto a first path and a second path;

splitting the first path into a first IF signal path and a first detection path, and splitting the second path into a second IF signal path and a second detection path, and setting a gain associated with the signal, wherein the detecting if the signal is present further includes detecting if the signal is present on the first detection path or the second detection path, wherein the adding the delay to the signal further includes adding the delay to the signal on the first IF signal path or the second IF signal path.

27. The method according to claim 26, wherein the setting the gain further includes setting the gain in part based on a predetermined criteria.

28. The method according to claim 27, wherein the predetermined criteria includes one or more criteria selected from the group consisting of: a distance between a receive frequency and a transmit frequency, a regulatory rule, a temperature, a received power level, a transmit power level, and a detected interference level.

29. The method according to claim 28, further comprising storing the predetermined criteria in a memory.

30. A method for frequency translation in a frequency translating repeater for use in a time division duplexing (TDD) radio protocol system, the method comprising:

detecting if a signal is present on one of two frequency channels associated with the frequency translating repeater;

changing a frequency channel associated with the signal from the one of the two frequency channels to an other of the two frequency channels;

adding a delay to the signal to compensate for a signal detection interval and a transmitter configuration interval; and adjusting a gain value of the signal in part based on a detected receive power level of the signal.

31. The method according to claim 30, wherein the adjusting the gain value is based on a criteria including which of the one of the two frequency channels the signal is received on, and which of the other of the two frequency channels is changed to.

32. The method according to claim 30, wherein the criteria further includes a regulatory rule for transmission.

33. The method according to claim 31, wherein the criteria further includes frequency separation between a receive frequency and a transmit frequency.

34. A method for frequency translation in a frequency translating repeater for use in a time division duplexing (TDD) radio protocol system, the method comprising:

detecting if a signal is present on one of two frequency channels associated with the frequency translating repeater and, if so, a receive power level of the signal;

converting the signal from a radio frequency (RF) signal to an intermediate frequency (IF) signal;

changing a frequency channel associated with the IF signal from the one of the two frequency channels to an other of the two frequency channels;

adding a delay to the IF signal to compensate for a signal detection interval and a transmitter configuration interval; and adjusting a gain value of the IF signal based at least in part on the detected receive power level of the signal.

35. The method according to claim 34, wherein the detecting and the adjusting are performed respectively on a first and a second signal path.

36. The method according to claim 35, wherein the detecting further includes generating a logarithmic signal from the signal and using the logarithmic signal for the adjusting.

37. The method according to claim 36, wherein the adjusting further includes using a predetermined criteria for adjusting the gain value of the IF signal.

38. The method according to claim 36, wherein the generating further includes converting the logarithmic signal to a digital signal; and wherein the adjusting further includes adjusting the gain value of the IF signal using the digital signal.

39. A frequency translating repeater for use in a time division duplexing communication system, the frequency translating repeater comprising:
at least two receivers capable of receiving transmissions on at least first and second frequency channels;
at least one transmitter capable of transmitting on the first frequency channel;
at least one transmitter capable of transmitting on the second frequency channel;
a detector circuit configured to detect if a signal is present on one of two frequency channels associated with the frequency translating repeater and for detecting a receive power level of the signal;
a frequency translator configured to change a frequency channel associated with the signal from an initial one of the first and second frequency channels to a subsequent one of the first and second frequency channels;
a gain control circuit for adjusting a gain of the signal;
a delay circuit configured to add a delay to the signal to compensate for a signal detection interval, a gain adjustment interval and a transmitter configuration interval; and
a microprocessor capable of configuring the first and second frequency channels based on pre-determined parameters stored therein, wherein
configuration of a specific frequency for the first frequency channel or the second frequency channel or both is based on the pre-determined parameters, and
the pre-determined parameters include at least one parameter selected from the group consisting of: regulatory transmitter power limitations, regulatory out-of-band emissions limitations, and frequency separation between the first and second frequency channels.

40. The method according to claim 34, further comprising:
splitting the signal onto a first path and a second path; and
splitting the first path into a first IF signal path and a first detection path, and splitting the second path into a second IF signal path and a second detection path,
wherein the detecting if the signal is present further includes detecting if the signal is present on the first detection path or the second detection path,
wherein the adding the delay to the IF signal further includes adding the delay to the signal on the first IF signal path or the second IF signal path.

41. The method according to claim 30, further comprising:
splitting the signal onto a first path and a second path; and splitting the first path into a first IF signal path and a first detection path, and splitting the second path into a second IF signal path and a second detection path,
wherein the detecting if the signal is present further includes detecting if the signal is present on the first detection path or the second detection path,
wherein the adding the delay to the IF signal further includes adding the delay to the signal on the first IF signal path or the second IF signal path.

42. A frequency translating repeater for use in a time division duplexing (TDD) radio protocol system, the repeater comprising:
means for detecting if a signal is present on one of two frequency channels associated with the frequency translating repeater;
means for changing a frequency channel associated with the signal from the one of the two frequency channels to an other of the two frequency channels; and
means for adding a delay to the signal to equivalent to a signal detection interval and a transmitter configuration interval.

43. The repeater according to claim 42, wherein the means for adding the delay includes means for delaying the signal in an analog storage device.

44. The repeater according to claim 42, wherein the means for adding the delay includes means for delaying the signal in at least one surface acoustic wave filter configured for one or more of: analog signal storage and channel selection.

45. The repeater according to claim 44, wherein the means for detecting includes an analog detection circuit.

46. The repeater according to claim 42, further comprising:
means for splitting the signal onto a first path and a second path;
means for splitting the first path into a first IF signal path and a first detection path, and splitting the second path into a second IF signal path and a second detection path, and
means for setting a gain associated with the signal,
wherein the means for detecting if the signal is present includes means for detecting if the signal is present on the first detection path or the second detection path,
wherein the means for adding the delay to the signal includes means for adding the delay to the signal on the first IF signal path or the second IF signal path.

47. The repeater according to claim 46, wherein the means for setting the gain includes means for setting the gain in part based on one or more predetermined criteria.

48. The repeater according to claim 47, wherein the one or more predetermined criteria includes at least one criterion selected from the group consisting of: a distance between a receive frequency and a transmit frequency, a regulatory rule, a temperature, a received power level, a transmit power level, and a detected interference level.

49. The repeater according to claim 48, further comprising storing the predetermined criteria in a memory.

50. The repeater according to claim 1, wherein the two frequency channels correspond to two different frequency channels included within one or more U-NII bands for operation in the United States.

* * * * *